United States Patent
Hsu

(10) Patent No.: US 8,538,720 B2
(45) Date of Patent: Sep. 17, 2013

(54) COLD BOOT TEST SYSTEM AND METHOD FOR ELECTRONIC DEVICES

(75) Inventor: Ming-Yuan Hsu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 401 days.

(21) Appl. No.: 12/955,911

(22) Filed: Nov. 30, 2010

(65) Prior Publication Data

US 2012/0041707 A1 Feb. 16, 2012

(30) Foreign Application Priority Data

Aug. 16, 2010 (TW) .............................. 99127234 A

(51) Int. Cl.
*G06F 19/00* (2011.01)
(52) U.S. Cl.
USPC .............. 702/119; 702/186; 714/25; 714/32; 714/36; 714/5.11; 714/718; 711/1; 711/2
(58) Field of Classification Search
USPC .............. 702/119, 186; 714/E11.17, 22, 55, 714/6.1, 6.3, 15, 36, 763, 6.32, 5.11, 38.14; 713/1, 2, 100, 193; 711/163, 152, 103, 115; 340/636.1, 636.19
See application file for complete search history.

(56) References Cited

U.S. PATENT DOCUMENTS

| | | | | |
|---|---|---|---|---|
| 5,195,130 A | * | 3/1993 | Weiss et al. | 379/93.19 |
| 5,353,240 A | * | 10/1994 | Mallory et al. | 702/186 |
| 6,009,541 A | * | 12/1999 | Liu et al. | 714/36 |
| 6,035,420 A | * | 3/2000 | Liu et al. | 714/25 |
| 6,757,838 B1 | * | 6/2004 | Chaiken et al. | 714/5.11 |
| 7,000,159 B2 | * | 2/2006 | Stern et al. | 714/718 |
| 7,143,275 B2 | * | 11/2006 | Cepulis et al. | 713/1 |
| 7,590,710 B1 | * | 9/2009 | Kokal et al. | 709/219 |
| 8,117,430 B2 | * | 2/2012 | Chien | 713/2 |
| 2004/0003082 A1 | * | 1/2004 | Abbondanzio et al. | 709/225 |
| 2004/0181716 A1 | * | 9/2004 | Stern et al. | 714/718 |
| 2009/0292911 A1 | * | 11/2009 | Chien | 713/2 |

* cited by examiner

*Primary Examiner* — Carol S Tsai
(74) *Attorney, Agent, or Firm* — Altis Law Group, Inc.

(57) ABSTRACT

A cold boot test system and method can control an electronic device to perform a cold boot process to test whether the electronic device is operable. The method sets time parameters for a test period of the cold boot process, drives a data communication interface of a computer to generate a period control signal according to the time parameters, and sends the period control signal to a controller via the data communication interface. The method further transfers the period control signal to the electronic device by controlling a power switch to switch on and switch off, controls the electronic device to execute the cold boot process to generate test information correspondingly. In addition, the method obtains the test information from the electronic device, and displays the test information on a display screen of the computer upon the condition that the cold boot process is abnormal.

16 Claims, 5 Drawing Sheets

US 8,538,720 B2

COLD BOOT TEST SYSTEM AND METHOD FOR ELECTRONIC DEVICES

BACKGROUND

1. Technical Field

Embodiments of the present disclosure relate to computer system test methods and systems, and particularly to a cold boot test system and method for an electronic device.

2. Description of Related Art

In order to assure the stability and reliability of electronic devices, such as computers or servers, it is necessary to perform a series of tests before the electronic devices are shipped. Among these tests, one of them is a cold boot test operation, which is method is to repeatedly execute actions of power on and power off of the electronic devices in a certain time interval, testing whether the electronic devices boot properly. For example, if a computer is able to start the operating system (OS) when the computer is powered on, then it is considered as a normal boot. Likewise, if the computer is able to exit the OS when the computer is powered off, then it is consider as a normal power-off.

However, the aforementioned approach of the boot test is normally performed by professional testers. During the boot test, when the electronic device is not able to boot normally, the current error conditions are not properly displayed or recorded before the next reboot test. As a result, the above-mentioned problems need to be addressed.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

As used herein, the term "cold boot test" is defined as a test for electronic devices by repeatedly powering on and powering off the electronic devices in a certain time interval, such as 5 seconds, to test whether the electronic devices boot properly. The cold boot test may include a boot process test and a power-off process test. The boot process test is to test whether a electronic device can normally start an operating system when the electronic device is powered on. The power-off process test is to test whether the electronic device can normally exit the operating system when the electronic device is powered off.

Figure 1:
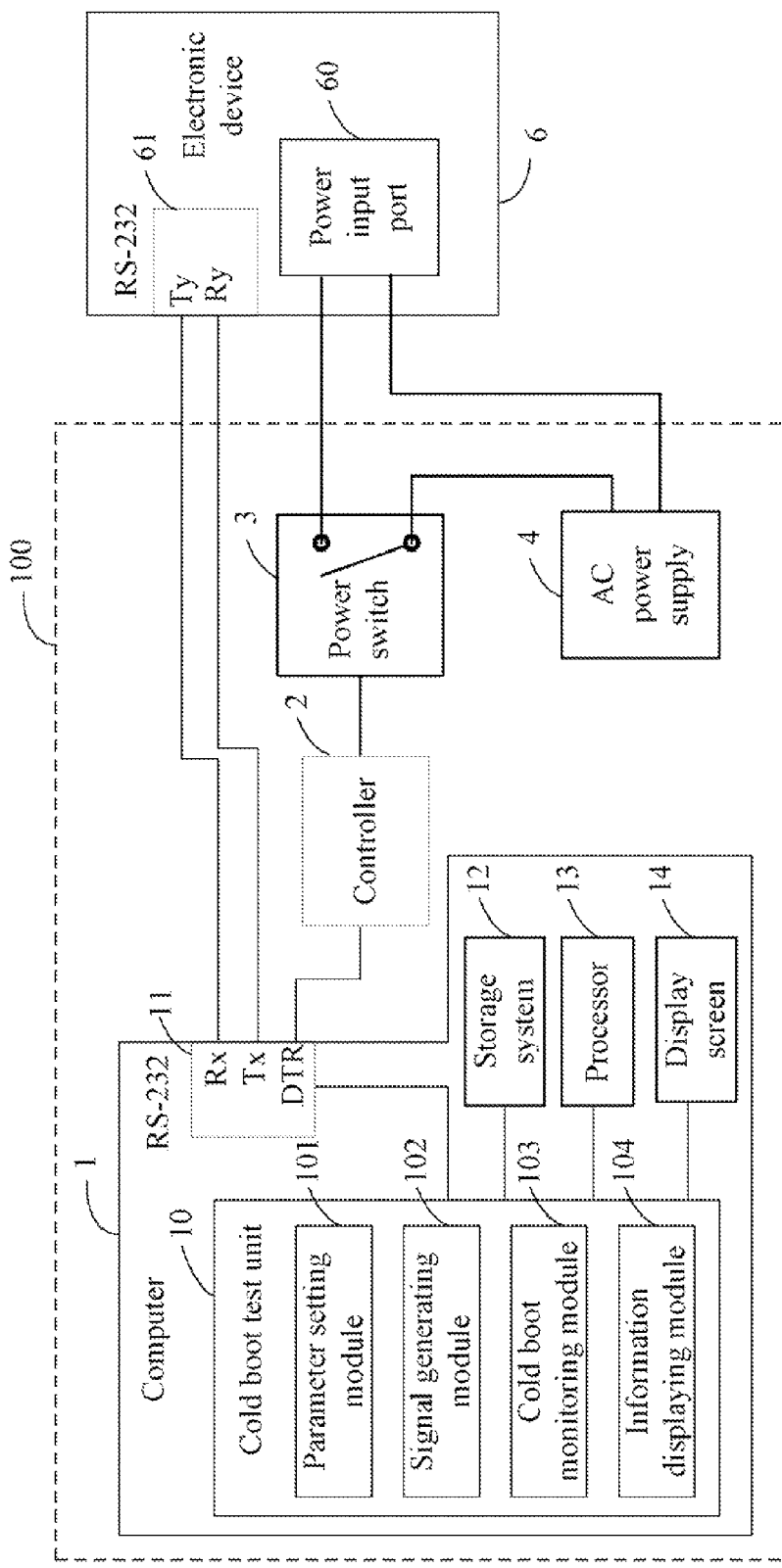
FIG. 1 is a schematic diagram of one embodiment of one example of a cold boot test system for an electronic device.

FIG. 1 is a schematic diagram of one embodiment of one example of a cold boot test system 100 for an electronic device 6. In the embodiment, the cold boot test system 100 can repeatedly simulate a power supply to power on and power off to test whether the electronic device 6 is operable. The electronic device 6 may be a personal computer, a notebook, a server, a workstation, or other computing devices. The electronic device 6 may include a power input port 60, and a data input interface 61 that includes a data receiving port (denoted as "Ry") and a data transmission port (denoted as "Ty").

In one embodiment, the cold boot test system 100 includes a computer 1, a controller 2, a power switch 3, and an alternating current (AC) power supply 4. The computer 1 may include a cold boot test unit 10, a data communication interface 11, a storage system 12, at least one processor 13, and a display screen 14. The cold boot test unit 10 may include a plurality of functional modules (see below) including one or more computerized instructions that are stored in the storage system 12, and communicates with the data communication interface 11. The data communication interface may be an RS-232 interface that includes a data receiving port (denoted as "Rx"), a data transmission port (denoted as "Tx"), and a data transmission ready (DTR) port.

The storage system 12 may store test times (e.g., 20 times) for testing a cold boot process of the electronic device 6. In one embodiment, the storage system 12 may be an internal storage device, such as a random access memory (RAM) for temporary storage of information, and/or a read only memory (ROM) for permanent storage of information. In some embodiments, the storage system 12 may also be an external storage device, such as an external hard disk, a storage card, or a data storage medium.

In one embodiment, the connection relationship among each of the components can be shown in FIG. 1 as follows. The Tx port of the data communication interface 11 connects to the Ry port of the data input interface 61, and the Rx port of the data communication interface 11 connects to the Ty port of the data input interface 61. The DTR port of the data communication interface 11 connects to the controller 2, and the controller 2 connects to the power switch 3. One port of the power switch 3 connects to the power input port 60, and another port connects to the AC power supply 4. The AC power supply 4 is configured to provide operation power of the electronic device 60.

Figure 2:
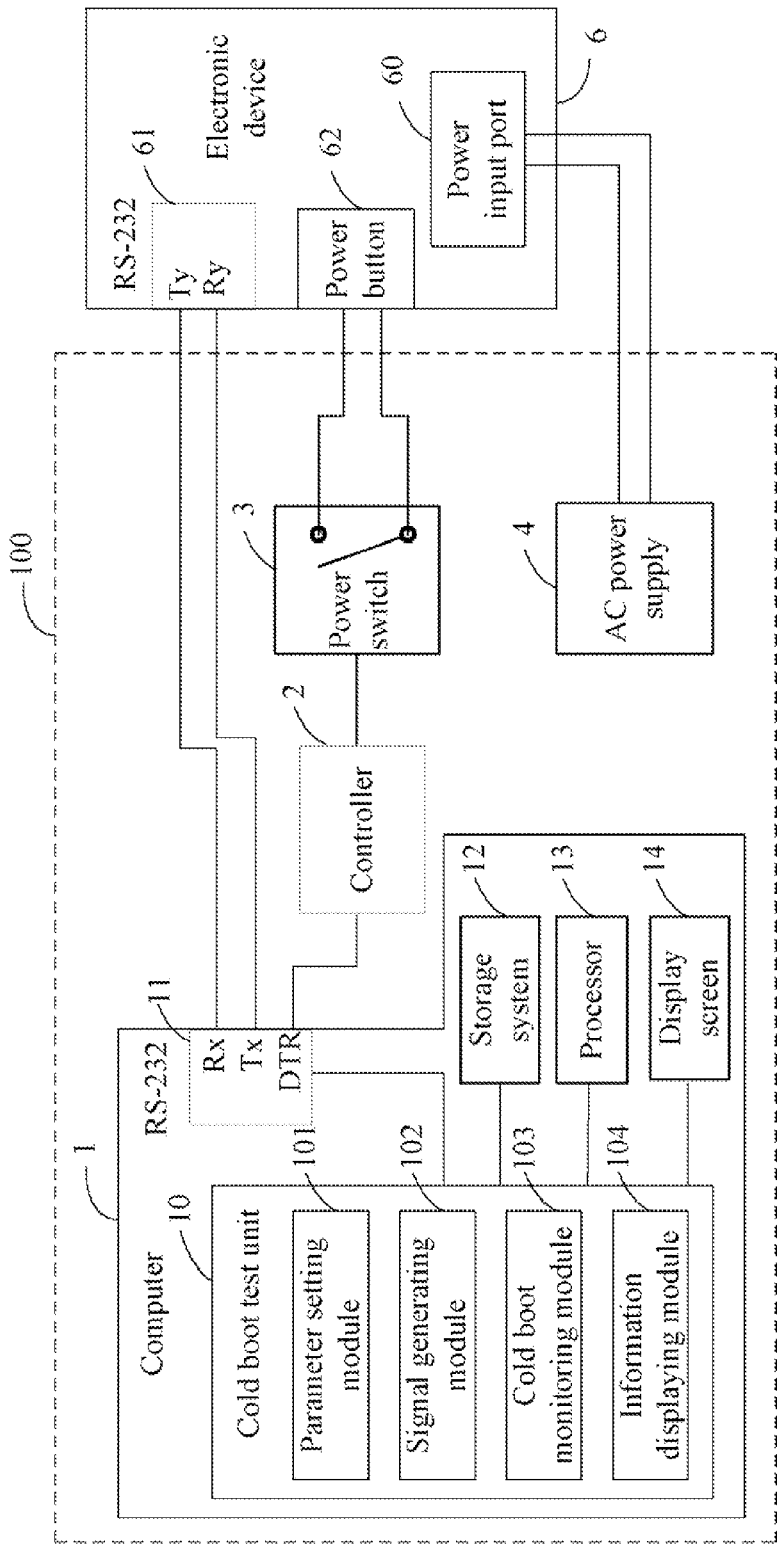
FIG. 2 is a schematic diagram of one embodiment of another example of the cold boot test system for the electronic device.

FIG. 2 is a schematic diagram of one embodiment of another example of the cold boot test system 100 for the electronic device 6. In the embodiment, the cold boot test system 100 can simulate a power button 60 of the electronic device 6 to power on and power off repeatedly for the cold boot test process, to test whether the electronic device 6 is operable. The components of FIG. 2 are the same as the components included in FIG. 1, except that the connection relationship among the power switch 3, the AC power supply 4, the power input port 60, and the power button 62. As shown in FIG. 2, two ports of the power switch 3 connects to the power button 62, and the AC power supply 4 connects to the power input port 60.

In one embodiment, the cold boot test unit 10 includes a parameter setting module 101, a signal generating module 102, a cold boot monitoring module 103, and an information displaying module 104. The modules 101-104 may comprise computerized code in the form of one or more programs that are stored in the storage system 12. The computerized code includes instructions that are executed by the at least one processor 13 to provide functions for implementing the modules 101-104. In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

The parameter setting module 101 is operable to set test times (e.g., 20 times) for testing a cold boot process of the electronic device 6, and set time parameters of a test period of the cold boot process. The time parameters include a first time parameter for simulating the cold boot process using the AC power supply 4, and a second time parameter for simulating the cold boot process using the power button 62.

Figure 3:
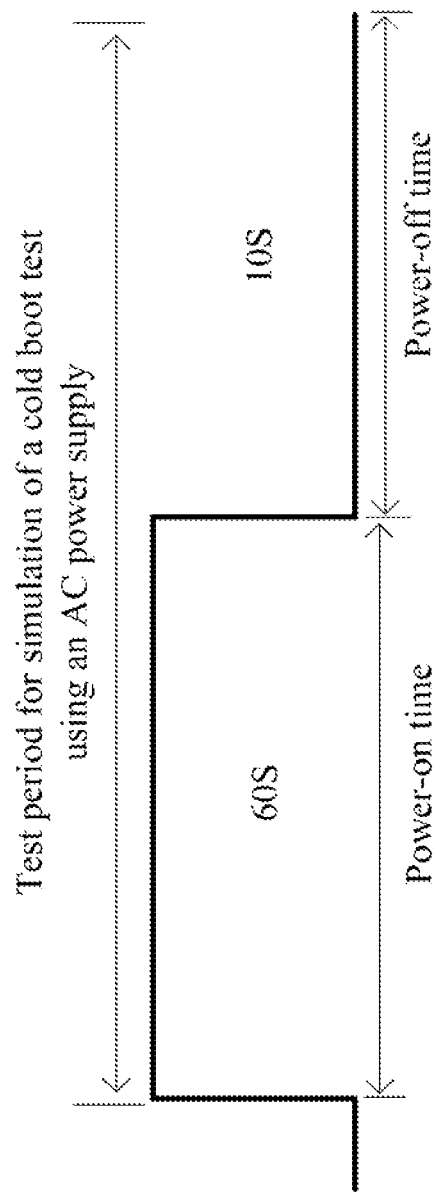
FIG. 3 shows a schematic diagram illustrating one example of a test period for simulating a cold boot process using an AC power supply of FIG. 1.
Figure 4:
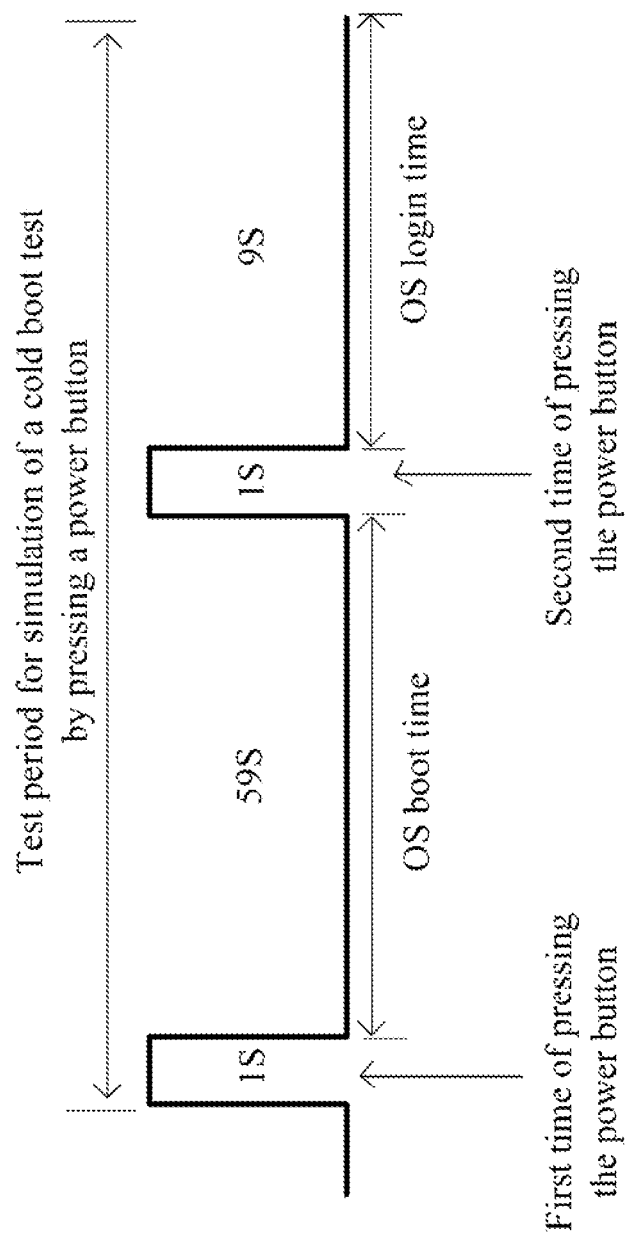
FIG. 4 shows a schematic diagram illustrating one example of a test period for simulating the cold boot process using a power button of FIG. 2.

The first time parameter includes a power-on time and a power-off time for the electronic device 6 by the AC power supply 4. In one example of FIG. 3, the power-on time may be set as 60 seconds, and the power-off time may be set as 10 seconds. The second time parameter includes a first time of pressing the power button 62, an OS boot time, a second time of pressing the power button 62, and an OS logout time. In one example of FIG. 4, the first time may be set as 1 second, the OS boot time may be set as 59 seconds, the second time may be set as 1 second, and the OS logout time may be set as 9 seconds.

The signal generating module 102 is operable to drive the data communication interface 11 (e.g., an RS-232 interface) to generate a period control signal according to the time parameters, and send the period control signal to the controller 2 by the DTR port of the data communication interface 11. The period control signal is defined as a signal that controls the electronic device 6 to execute the cold boot process, such as power-on and power-off repeatedly.

The signal generating module 102 drives the RS-232 interface to generate a first period control signal for simulating the cold boot process by using the AC power supply 4 according to the first time parameter, and generate a second period control time parameter for simulating the cold boot process by pressing the power button 62 according to the second time parameter.

The controller 2 controls the power switch 3 to switch-on or switch-off to transfer the first period control signal to the power input port 60 according to the first time parameter, or transfer the second period control signal to power button 62 according to the second time parameter. As such, the electronic device 6 performs the cold boot process according to the first or the second period control signal, and generates test information of the cold boot process correspondingly. In the embodiment, the test information may include normal information and abnormal information when the electronic device 6 executes the Power On Self Test (POST). The normal information are generated when the electronic device 6 is workable, and the abnormal information are generated when the electronic device 6 is unworkable.

The cold boot monitoring module 103 is operable to obtain the test information from the electronic device 6 through the data communication interface 11, and determine whether the cold boot process is normal according to the test information. When the cold boot process of the electronic device 6 is abnormal, the cold boot monitoring module 103 controls the electronic device 6 to terminate the cold boot process according to the test control signal. The cold boot monitoring module 103 is further operable to determine whether current test times equal the set test times. When the current test times equal the set test times, the cold boot monitoring module 103 controls the electronic device 6 to terminate the cold boot process according to the test control signal.

The information displaying module 104 is operable to display the test information on the display screen 14 during the cold boot process of the electronic device 6. In the embodiment, if the cold boot process of the electronic device 6 is workable, the normal information is displayed on the display screen 14. If the cold boot process of the electronic device 6 is unworkable, the abnormal information is displayed on the display screen 14.

Figure 5:
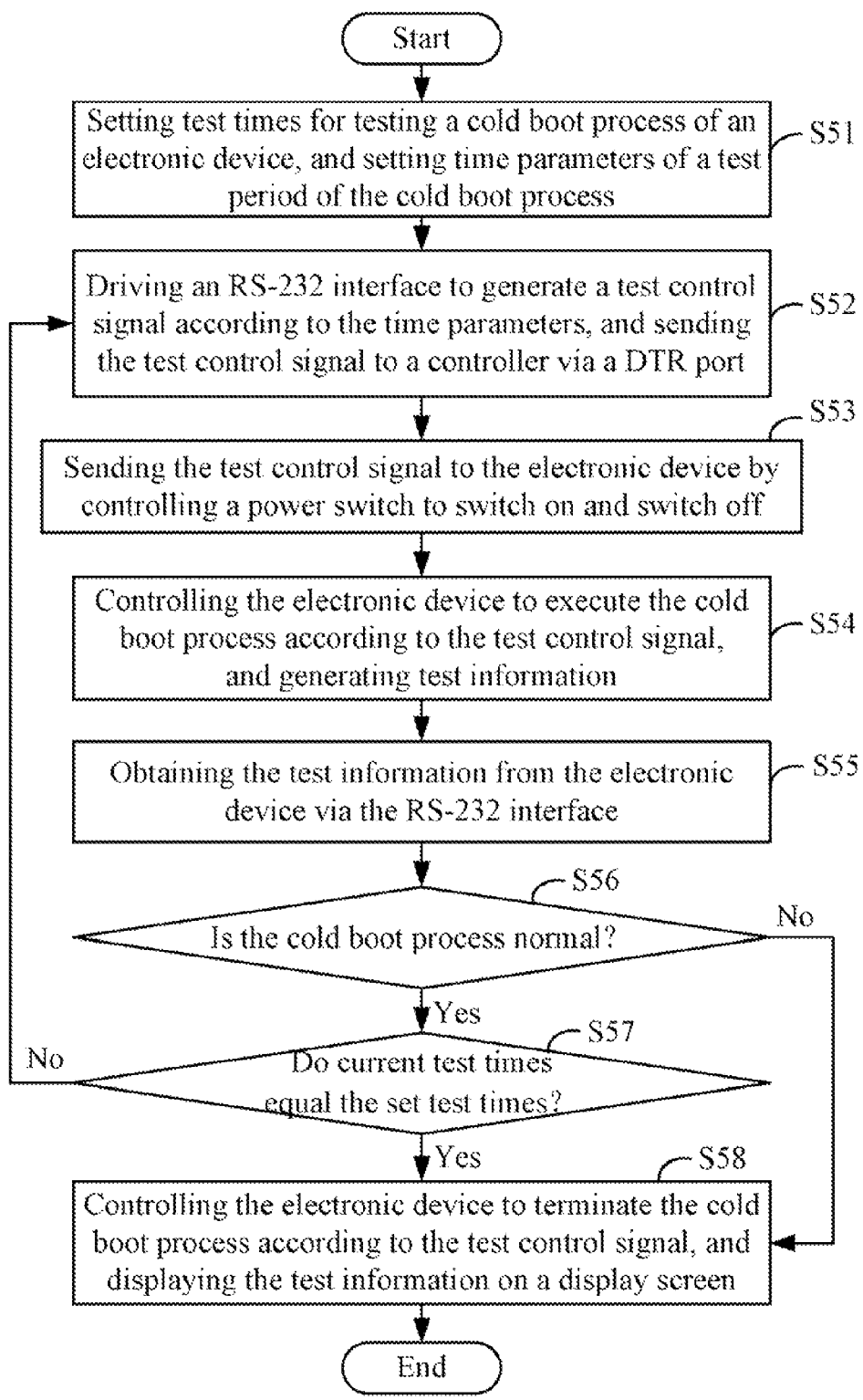
FIG. 5 is a flowchart of one embodiment of a cold boot test method for an electronic device by using the system of FIG. 1 and FIG. 2.

FIG. 5 is a flowchart of one embodiment of a cold boot test method for an electronic device by using an system, such as the system 100 of FIG. 1 or FIG. 2, for example. In the embodiment, the method can repeatedly control the electronic device 6 to perform a cold boot test to test whether the electronic device 6 is operable. As mentioned above, the cold boot test may include a boot process test and a power-off process test for the electronic device 6. Depending on the embodiment, additional blocks may be added, others removed, and the ordering of the blocks may be changed.

In block S51, the parameter setting module 101 sets a number of test times (e.g., 20 times) for testing a cold boot process of the electronic device 6, and sets a plurality of time parameters of a test period of the cold boot process. The time parameters include a first time parameter for simulating the cold boot process by using the AC power supply 4, and a second time parameter for simulating the cold boot process by pressing the power button 62.

In block S52, the signal generating module 102 drives the data communication interface 11 (e.g., an RS-232 interface) to generate a period control signal according to the time parameters, and sends the period control signal to the controller 2 via a DTR port of the data communication interface 11. As mentioned above, the time parameters include a first time parameter (see FIG. 3) and a second time parameter (see FIG. 4). In one embodiment, the RS-232 interface generates a first period control signal for simulating the cold boot process using the AC power supply 4 according to the first time parameter, and generates a second period control time parameter for simulating the cold boot process using the power button 62 according to the second time parameter.

In block S53, the controller 2 sends the period control signal to the electronic device 6 by controlling the power switch 3 to switch-on and switch-off. In one embodiment, the controller 2 controls the power switch 3 to switch-on and switch-off to transfer the first period control signal to the power input port 60 according to the first time parameter, and controls the power switch 3 to switch-on and switch-off to transfer the second period control signal to power button 62 according to the second time parameter.

In block S54, the electronic device 6 performs the cold boot process according to the first or the second period control signal, and generates test information of the cold boot process. In the embodiment, the test information may include normal information and abnormal information when the electronic device 6 executes the Power On Self Test (POST). The normal information are generated when the electronic device 6 is workable, and the abnormal information are generated when the electronic device 6 is unworkable.

In block S55, the cold boot monitoring module 103 obtains the test information from the electronic device 6 through the data communication interface 11. In block S56, the cold boot monitoring module 103 determines whether the cold boot process is normal according to the test information. If the cold boot process of the electronic device 6 is normal, block S57 is implemented. If the cold boot process of the electronic device 6 is abnormal, block S58 is implemented.

In block S57, the cold boot monitoring module 103 determines whether current test times equal the set test times. If the current test times equal the set test times, block S58 is implemented. If the current test times are less than the set test times, block S52 is repeated.

In block S58, the cold boot monitoring module 103 controls the electronic device 6 to terminate the cold boot process according to the test control signal, and the information displaying module 104 displays the test information on the display screen 14. In the embodiment, the normal information is displayed on the display screen 14 when the cold boot process of the electronic device 6 is workable. The abnormal information is displayed on the display screen 14 when the cold boot process of the electronic device 6 is unworkable.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A computer for testing a cold boot of an electronic device, the computer being connected to a controller via a data communication interface, the controller connecting to the electronic device via a power switch, the computer comprising:
    a storage system;
    at least one processor; and
    one or more programs stored the storage system and executable by the least one processor, the one or more programs comprising:
    a parameter setting module operable to set time parameters for a test period of a cold boot process for the electronic device, wherein the time parameters comprise a first time parameter for simulating the cold boot process using an alternating current (AC) power supply connected to the power switch, and a second time parameter for simulating the cold boot process by pressing of a power button of the electronic device;
    a signal generating module operable to drive the data communication interface to generate a period control signal according to the time parameters, and send the period control signal to the controller via the data communication interface;
    wherein the controller transfers the period control signal to the electronic device by controlling the power switch to switch on and switch off, and the electronic device to executes the cold boot process according to the period control signal and generates test information during the cold boot process;
    a cold boot monitoring module operable to receive the test information from the electronic device via the data communication interface, and determine whether the cold boot process is normal according to the test information; and
    an information displaying module operable to display the test information on a display screen of the computer upon the condition that the cold boot process is abnormal.

2. The computer according to claim 1, wherein the parameter setting module is further operable to set test times for testing the cold boot process of the electronic device.

3. The computer according to claim 2, wherein the cold boot monitoring module is further operable to determine whether current test times equals the set test times, and control the electronic device to terminate the cold boot process according to the test control signal upon the condition that the current test times equal the set test times.

4. The computer according to claim 1, wherein the first time parameter comprises a power-on time and a power-off time for the electronic device by the AC power supply.

5. The computer according to claim 1, wherein the second time parameter includes a first time of pressing the power button an operating system booting time, a second time of pressing the power button, and an operating system logout time.

6. The computer according to claim 1, wherein the data communication interface is an RS-232 interface that includes a data receiving port, a data transmission port, and a data transmission ready (DTR) port.

7. A cold boot test method for an electronic device, the method comprising:
    setting time parameters for a test period of a cold boot process of the electronic device wherein the time parameters comprise a first time parameter for simulating the cold boot process using an alternating current (AC) power supply connected to a power switch, and a second time parameter for simulating the cold boot process by pressing of a power button of the electronic device;
    driving a data communication interface of a computer to generate a period control signal according to the time parameters, and sending the period control signal to a controller connecting to the computer via the data communication interface;
    transferring the period control signal to the electronic device by controlling the power switch to switch on and switch off;
    controlling the electronic device to execute the cold boot process according to the period control signal, and generating test information during the cold boot process;
    obtaining the test information from the electronic device via the data communication interface;
    determining whether the cold boot process is normal according to the test information; and
    displaying the test information on a display screen of the computer upon the condition that the cold boot process is abnormal.

8. The method according to claim 7, further comprising:
    setting test times for testing the cold boot process of the electronic device;
    determining whether current test times equal the set test times; and
    controlling the electronic device to terminate the cold boot process according to the test control signal upon the condition that the current test times equal the set test times.

9. The method according to claim 7, wherein the first time parameter comprises a power-on time and a power-off time for the electronic device by the AC power supply.

10. The method according to claim 7, wherein the second time parameter includes a first time of pressing the power button, an operating system booting time, a second time of pressing the power button, and an operating system logout time.

11. The method according to claim 7, wherein the data communication interface is an RS-232 interface that includes a data receiving port, a data transmission port, and a data transmission ready (DTR) port.

12. A storage medium having stored thereon instructions that, when executed by at least one processor of a computing device, causes the computing device to perform a cold boot test method for an electronic device, the method comprising:
    setting time parameters for a test period of a cold boot process of the electronic device wherein the time parameters comprise a first time parameter for simulating the cold boot process using an alternating current (AC) power supply connected to a power switch, and a second time parameter for simulating the cold boot process by pressing of a power button of the electronic device;

driving a data communication interface of a computer to generate a period control signal according to the time parameters, and sending the period control signal to a controller connecting to the computer via the data communication interface;

transferring the period control signal to the electronic device by controlling the power switch to switch on and switch off;

controlling the electronic device to execute the cold boot process according to the period control signal, and generating test information during the cold boot process;

obtaining the test information from the electronic device via the data communication interface;

determining whether the cold boot process is normal according to the test information; and displaying the test information on a display screen of the computer upon the condition that the cold boot process is abnormal.

13. The storage medium according to claim 12, wherein the further comprises:

setting test times for testing the cold boot process of the electronic device;

determining whether current test times equals the set test times; and controlling the electronic device to terminate the cold boot process according to the test control signal upon the condition that the current test times equal the set test times.

14. The storage medium according to claim 12, wherein the first time parameter comprises a power-on time and a power-off time for the electronic device by the AC power supply.

15. The storage medium according to claim 12, wherein the second time parameter includes a first time of pressing the power button an operating system booting time, a second time of pressing the power button, and an operating system logout time.

16. The storage medium according to claim 13, wherein the data communication interface is an RS-232 interface that includes a data receiving port, a data transmission port, and a data transmission ready (DTR) port.

* * * * *